United States Patent [19]
Lloyd

[11] Patent Number: 6,083,386
[45] Date of Patent: Jul. 4, 2000

[54] METHOD OF TREATING ANIMAL WASTE

[75] Inventor: Paul Don Lloyd, Newport, N.C.

[73] Assignee: AgTech Environmental, Inc.

[21] Appl. No.: 09/208,526

[22] Filed: Dec. 9, 1998

Related U.S. Application Data

[60] Provisional application No. 60/095,934, Aug. 10, 1998.

[51] Int. Cl.[7] ..................................................... C02F 1/76
[52] U.S. Cl. ................... 210/195.1; 119/527; 210/195.3; 210/199; 210/202; 210/203; 210/257.1
[58] Field of Search ......................... 119/527; 210/195.1, 210/195.3, 196, 199, 202, 203, 257.1, 167, 172, 903, 905, 916

[56] References Cited

U.S. PATENT DOCUMENTS

| | | | |
|---|---|---|---|
| 3,577,341 | 5/1971 | Keith, Jr. et al. | 210/712 |
| 3,791,790 | 2/1974 | Wyndham | 21/54 R |
| 3,846,293 | 11/1974 | Campbell | 210/631 |
| 3,875,319 | 4/1975 | Seckler et al. | 426/489 |
| 4,049,545 | 9/1977 | Horvath | 210/46 |
| 4,121,539 | 10/1978 | Moore | 119/28 |
| 4,214,887 | 7/1980 | van Gelder | 71/9 |
| 4,824,563 | 4/1989 | Iwahori et al. | 210/195.1 |
| 5,013,441 | 5/1991 | Goronszy | 210/605 |
| 5,053,140 | 10/1991 | Hurst | 210/704 |
| 5,395,529 | 3/1995 | Butler | 210/619 |
| 5,451,326 | 9/1995 | Carlson et al. | 210/708 |
| 5,514,282 | 5/1996 | Hibbard et al. | 210/652 |
| 5,545,325 | 8/1996 | Hsu et al. | 210/605 |
| 5,614,102 | 3/1997 | Sakurada | 210/718 |
| 5,637,219 | 6/1997 | Robinson et al. | 210/603 |
| 5,755,852 | 5/1998 | Northrop | 71/9 |
| 5,879,546 | 3/1999 | Burford | 210/96.1 |
| 5,914,040 | 6/1999 | Pescher et al. | 210/638 |
| 5,942,107 | 8/1999 | Busch, Jr. | 210/195.2 |

*Primary Examiner*—Peter A. Hruskoci
*Attorney, Agent, or Firm*—Valerie E. Looper

[57] ABSTRACT

A method for treating waste from animal husbandry sites. The process is a closed loop system with no need for an anerobic lagoon.

5 Claims, 3 Drawing Sheets

METHOD OF TREATING ANIMAL WASTE

This application claims benefit of provisional application 60/095,934, Aug. 10, 1998.

RELATED APPLICATION INFORMATION

This application is a continuation-in-part of provisional U.S. Ser. No. 60/095,934 titled Innovative Process to Treat Animal Waste, filed Aug. 3, 1998 by Paul D. Lloyd.

FIELD OF THE INVENTION

The present invention relates generally to the field of animal waste treatment, specifically the treatment of solid and liquid waste from agricultural sites. More specifically, it relates to an improved device and process for treating a waste stream in a closed loop system without using an open-air pond, or lagoon. The process yields solids that can be captured and processed as fertilizer as well as wash water for the animal pens, water for other purposes such as irrigation, and, optionally, potable drinking water for the animals.

BACKGROUND OF THE INVENTION

Raising animals has become a big business. In North Carolina alone, for example, the poultry, swine and dairy businesses are worth about $4 billion annually, and employ at least about 40,000 people directly. This translates into about 4,000 farms in North Carolina alone having facilities devoted to swine, each of which must conform to the appropriate environmental regulations. The present technological standard is a system utilizing an anaerobic lagoon, and most facilities are so equipped. While these systems do act to contain much of the waste, they leave something to be desired.

For swine, a typical lagoon system would be described as follows: the farm has several barns which have floors made of slats and a collection basin under each building. The animals are housed in the barns, and their feces, slops, urine and spilled drinking water fall through the slats into the collection basin. Each barn also has two 400 to 800 gallon flush tanks. Every three to six hours, about 800 to 1,600 gallons of water per barn are dumped into the collection basin, which washes the waste by gravity feed to an anerobic lagoon. Such a system is described in U.S. Pat. No. 4,913,095, "Flushing System for Hog Houses", issued to Morrow, et al. Apr. 3, 1990. The flush tanks are then refilled using water from the top of the lagoon. In an alternative system, referred to as a pit-recharge system, about two feet of water is kept under the barn in an enlarged version of the collection basin. This pit has an outlet which is opened on a weekly basis to allow the water to drain to an anaerobic lagoon. The pit is then refilled using water from the lagoon.

In theory, the solids in a lagoon settle out and are anaerobically digested over time by benign bacteria. After a certain amount of time, the top layer of water is purified enough to allow it to be drawn off and reused, either as wash water, or as water for crops. In practice, the quality of the water drawn off is not good enough to make it useable for all crops, and when the water is sprinkled on a field, it releases noxious odors. Further, the quality of water is not good enough to be used as drinking water for the animals, so there is a steady addition of water to the system due to the spillage from the fresh water system as well as water in the form of urine and feces from the animals. The rate of evaporation and draw-off of water are often less than the rate of influx of water as well as solids into the lagoon. As a result, the lagoon gradually fills up.

A typical lagoon might be twelve feet deep and contain about 10 feet of water, and 1200 tons of solids. Such a lagoon also contains a large amount of ammonia, nitrates, nitrites and phosphorus, and may on occasion contain disease-causing bacteria. If rainfall is unusually heavy, or if the liner for the lagoon cracks, significant amounts of pollutants can be released, possibly rendering water wells on neighboring land unfit for use, causing an overgrowth of algae in runoff streams, or even resulting in fish kills in rivers. Lagoons release noxious odors into the air, and have been associated with acid rain.

As a result of the difficulties of managing lagoon systems, several states have already issued moratoriums on the building of new lagoons, and have mandated the development of new technologies, and some progress has been seen. A variety of technologies have been proposed.

One class of technologies involves the use of microorganisms to digest the waste, in imitation and extension of natural processes. Such systems are well known, and they as well as various improvements thereon are described in any number of references, including U.S. Pat. No. 5,013,441, "Biological Nutrient Removal with Sludge Bulking Control in a Batch Activated Sludge System, issued to Goronszy May 7, 1991, which relies on digestion steps accomplished by both aerobic and anaerobic bacteria. U.S. Pat. No. 5,755,852, "Bioconverted Nutriet Rich Humus", issued to Northrop May 26, 1998 relates to a process wherein solids in an aqueous slurry of animal excrement are settled or precipitated in a solids ecoreactor and treated in a bioreactor both by aerobic and anaerobic processes to bioconvert soluble phosphorus, nitrogen and organics. U.S. Pat. No. 5,637,219, Means for Continuous Digestion of Organic Matter issued to Robinson, et al. Jun. 10, 1997 relates to a multistage process for biological and chemical digestion of waste, which utilizes a reaction vessel having separate control of the reaction conditions for different processes in different chambers. U.S. Pat. No. 5,395,529 "Apparatus for the Treatment of Sewage issued to Butler Mar. 7, 1995 relates to an improved rotating biological contactor for removing particulates or solids from sewage effluent instead of a settling tank in a bacteria-dependent process. The improved systems tend to be elaborate, requiring costly installation and supervision.

Other processes which do not rely on bacterial action have been explored. For example, U.S. Pat. No. 4,214,887 "Sewage and Waste Water Treatment" issued to van Gelder Jul. 29, 1980 relates to the use of a hydrocyclone and 20 micron filter along with a 5 micron filter in combination with an ozonator. This process is designed for streams with a relatively low solids load of about 300 ppm, and, without more, would be impractical in the present situation, where total solids loads of 1500 ppm may be encountered.

Processes which are primarily chemical have been explored. For Example, U.S. Pat. No. 4,049,545 "Chemical Waste Water Treatment Method" issued to Horvath Sep. 20, 1977, describes a chemical method of treating domestic, commercial, or industrial waste water that relies on the successive addition of a coagulant aid such as portland cement and precipitation aids such as aluminum sulfate and copper sulfate followed by potassium permanganate and ozone as oxidizing and disinfecting agents. Another example is U.S. Pat. No. 5,614,102 "Method for Purifying Water" issued to Sakurada Mar. 25, 1997, which relates to the use of at least two kinds of flocculants to treat sewage, followed by the use of at least three flocculants. Both processes are complicated enough to require continual monitoring of pH and other process parameters by a qualified operator.

Processes of varying scale have been explored. Municipal waste treatment plants, for example, utilize varying combinations of filtering, drying, chemical treating, digesting, and chemical treatment steps. These systems are enormous, and require large facilities permanently imbeded in the land. Conversely, processes on a much smaller scale have also been devised. U.S. Pat. No. 3,791,790 "Portable Purification Device for Fluids issued to Wyndham et al. Feb. 12, 1974 relates to a hand-held water purifier that uses a hand-operated diaphragm pump, filter, and a battery-operated germicidal lamp to eliminate microorganisms and particulates from small amounts of water. The scale of this device is not comparable to the present invention, as it is disclosed to produce 1.5 quarts of water per minute.

Closed loop systems have been attempted. U.S. Pat. No. 4,121,539 "Animal Enclosure System with Waste Treatment Means" issued Oct. 24, 1978 to Moore relates to a lagoon system that additionally uses airtight holding tanks for a waste stream, the first producing ammonia gas at ambient temperatures and the second for further digestion of the waste, where methane gas is produced.

The present inventor has developed a lagoon-less system, which is a precursor for the present invention, for recycling waste from animal houses which greatly improves the water quality of the effluent over that typically found in lagoon systems, variations of this system are disclosed below in FIGS. 2 and 3, and the discussion therewith. This is a closed loop system that utilizes aerobic bacteria. As such, the system still requires an air supply, bacteria, and extended residence time in a holding tank. Due the the presence of bacteria as an integral part of the system, licensed operators are required to monitor the system at least daily. Further, the closed loop system as disclosed in FIGS. 2 and 3 is much larger than the present invention, requires installation of permanent fixtures at the site, and would require further modification to produce potable water.

The present invention relates to an improved device and process for treating animal waste that is a closed loop system which yields water with greatly reduced carbon and nitrogen levels, and optionally, potable drinking water, plus solids that may be processed as fertilizer. The system does not require a lagoon or the addition of permanent structures to the land. It is relatively simple to monitor, and amenable to an electronic control system. It can produce a healthier environment for animals, and thereby increase profitability to the farmer.

DETAILED DESCRIPTION OF THE DRAWINGS

Figure 1:
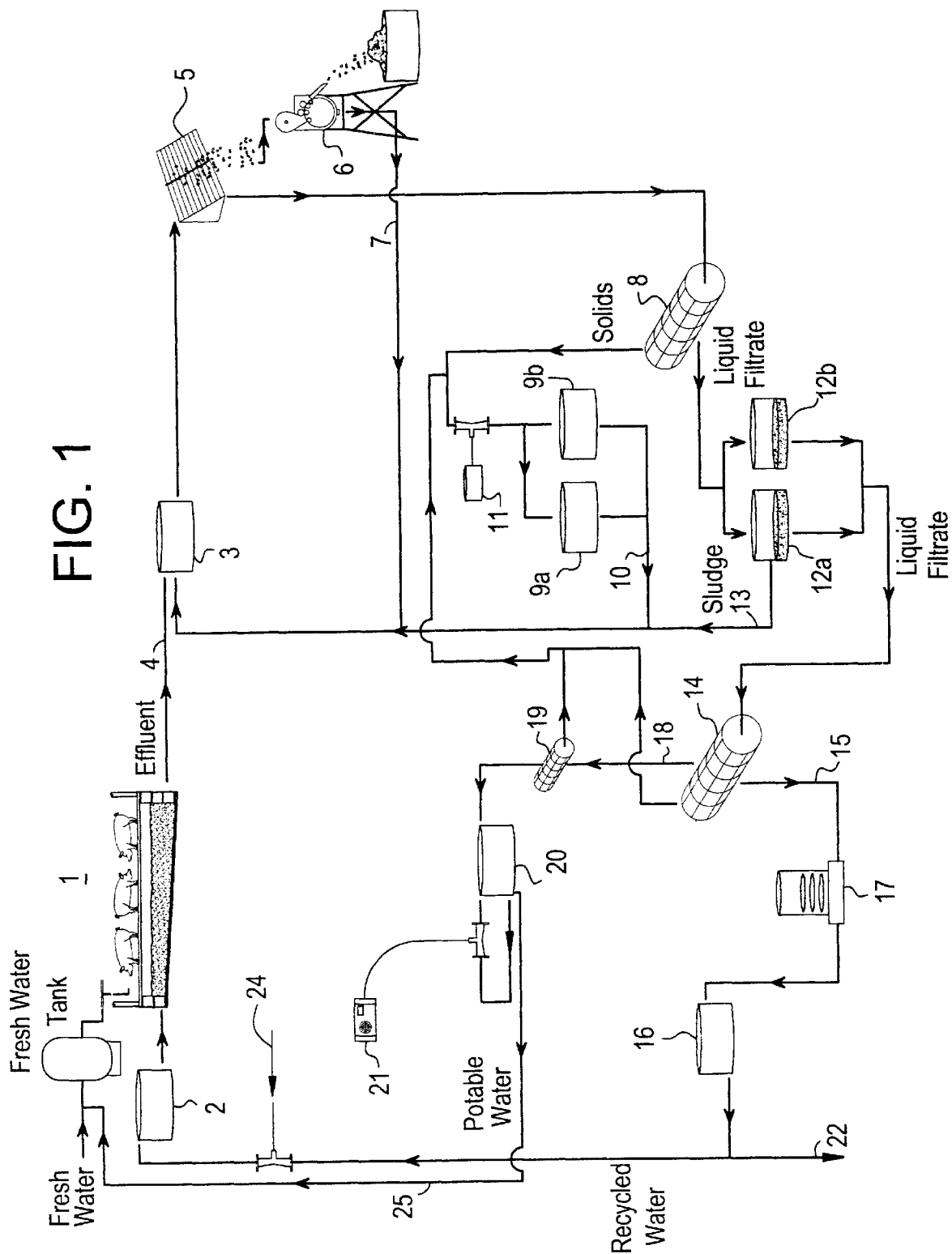
FIG. 1 is a flow diagram of the invented system, which yields both clean wash water and potable drinking water.

Turning to FIG. 1, an animal house or production building (1) is equipped with one or more storage tanks for recycled water, or flush tanks (2) and connected to a waste water storage tank, or equalization tank, (3) by a gravity feed line (4). Animal waste drops through slats in the floor of the house (1) into a pit (not shown) that is periodically flushed by water from the flush tank (2), which flows by way of the gravity feed line (4) to the equalization tank (3). From the equalization tank, the waste stream is pumped to a separator, illustrated here as a two-step process using inclined screen separator (5) and roller press separator (6). While separators (5) and (6) are shown as separated devices, it is contemplated that they can be combined into a single separation unit. Solids are separated from the waste stream by the separators (5 and 6) and may be further treated to yield other end products, for example, various classes of fertilizer. The water, or effluent pressed from the solids at the second separator (6) is returned to the equalization tank (3) by return flow line (7). Some of the water, or effluent, from the separators (5 and 6) is pumped to a first filter (8). If the filter (8) is an automatic backwash filter, the backwash, or sludge, is pumped automatically to sludge holding tanks (9a,b). Sludge from tanks (9a,b) is returned by sludge return line (10) to the equalization tank (3), or in the alternative (not shown) to the separators (5 and 6). Where it is desirable to treat the sludge with an additive such as a flocculant, the sludge tanks may be equipped with an additive reservoir (11). Sludge tanks (9a,b) are operated in tandem so that an additive from reservoir (11) can be injected into one tank as it fills, while the other tank allows the additive sufficient residence time to perform its function. The liquid filtrate from first filter (8) is subjected to a nitrogen removal, or nitrification/denitrification step at nitrogen treatment tanks (12a,b). As is the case with the sludge tanks, it is advantageous to use two tanks operated in tandem. Sludge that settles in these tanks (12a,b) is returned to equalization tank (3) by sludge return line (13). The fluid stream from the nitrification or denitrification step is flowed to a second filter (14).

The fluid stream from the second filter (14) is in excess of the amount that can be used by the flush system. The reason is that there is a steady influx of water from the drinking water system. The excess water can be treated and used for a variety of purposes. As a consequence, the fluid stream from the second filter (14) is split. A first filter feed line (15) leads to a first pathogen treatment tank (16), which, in this embodiment, is equipped with a chlorinator (17). The stream flowing from the first pathogen treatment tank (16) is pathogen-free wash water, and may be treated using an odor control injection system (24) before it feeds into the flush tank (2). A second filter feed line (18) feeds to a third filter (19) followed by a second pathogen treatment tank (20), which in this embodiment is equipped with an ozone treatment system (21a,b). The fluid stream from the second pathogen treatment tank (20) is potable water, and may feed, for example, into the fresh water line (25) to fresh water pressure tank. Returning to the second filter (14), a third filter feed line (22) may be added to divert recycled water to certain non-demanding applications, such as irrigation. The second and third filters also have outlets for sludge or backwash to the sludge holding tanks (9a,b).

For control purposes, drinking water line (25) can be equipped with a valve system and a probe (neither shown) so that if the water exceeds a predetermined limit, the drinking water line (25) is shut off, and the water is recycled to the second pathogen treatment tank (20).

Figure 2:
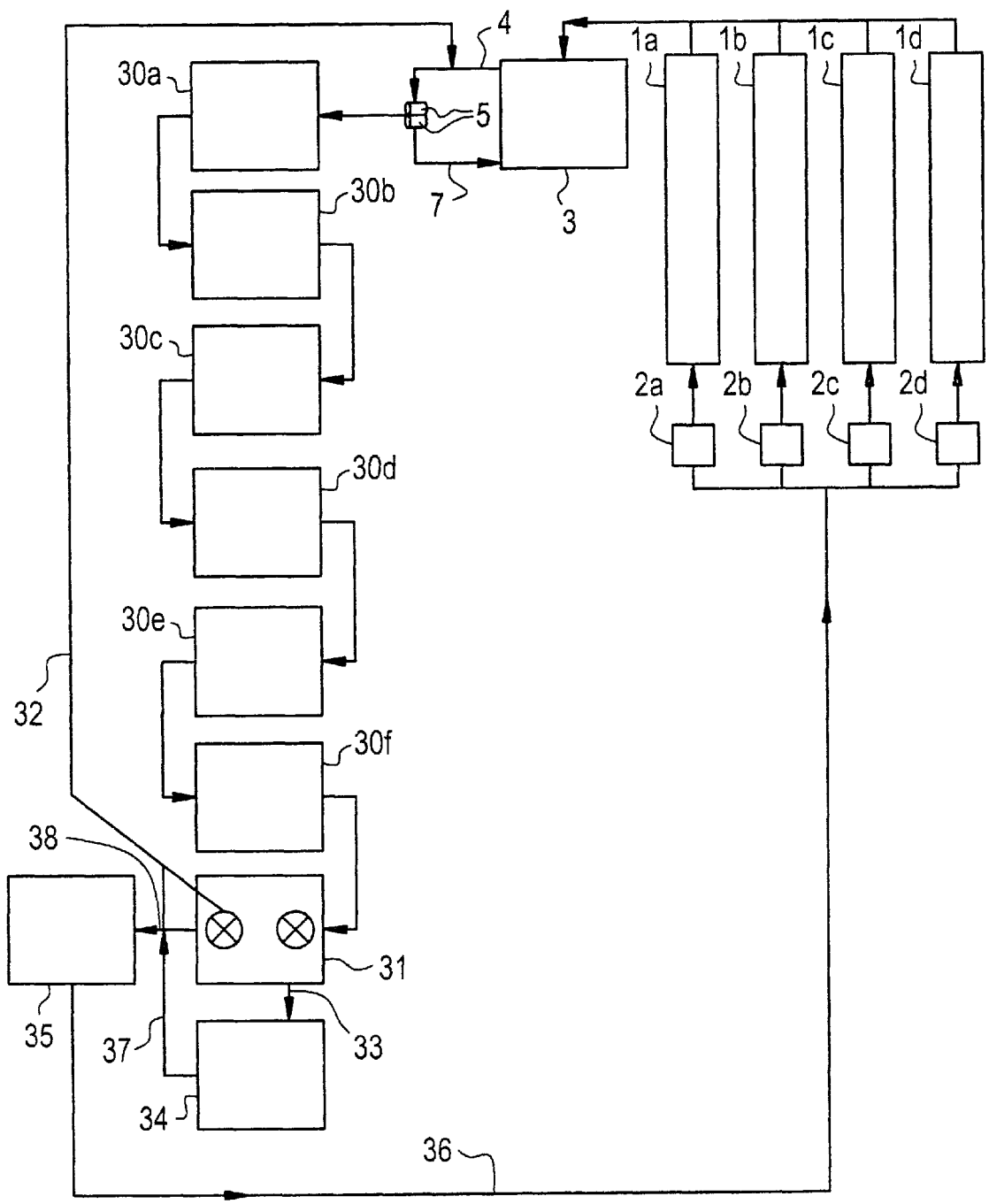
FIG. 2 is a flow diagram of a prior art aerobic water treatment system.

FIG. 2 shows a similar arrangement with respect to animal houses (1a–d), flush tanks (2a, 2b), equalization tank (3) by a gravity feed line (4) and separator (5). As in FIG. 1, solids are separated from the waste stream by the separator (5) and may be further treated to yield various classes of fertilizer. Some of the water, or effluent from the separator (5) is returned to the equaliztion tank (3) by return flow line (7) in order to maintain equilibrium flow from the equalization tank (3) to the separator (5). What effluent which is not returned to the equalization tank (3) is pumped to serpentine aeration tanks (30a–f) which are equipped with air diffusers supplied by air blowers (not shown), and then hopper clarifiers (31) which are equipped with return activated sludge line (32) which feeds to the separator (5) and waste sludge line (33) which feeds to sludge holding tank (34), as well as a weir, or trough with notches in it to control the water flow (not shown) at the top of the clarifier (31) which feeds to a line (38) to the supernatant holding tank (35). The supernatant holding tank (35) has a return line (36) which leads to the flush tanks (2). The sludge holding tank (34) has a return line (37) to the separator (5).

Figure 3:
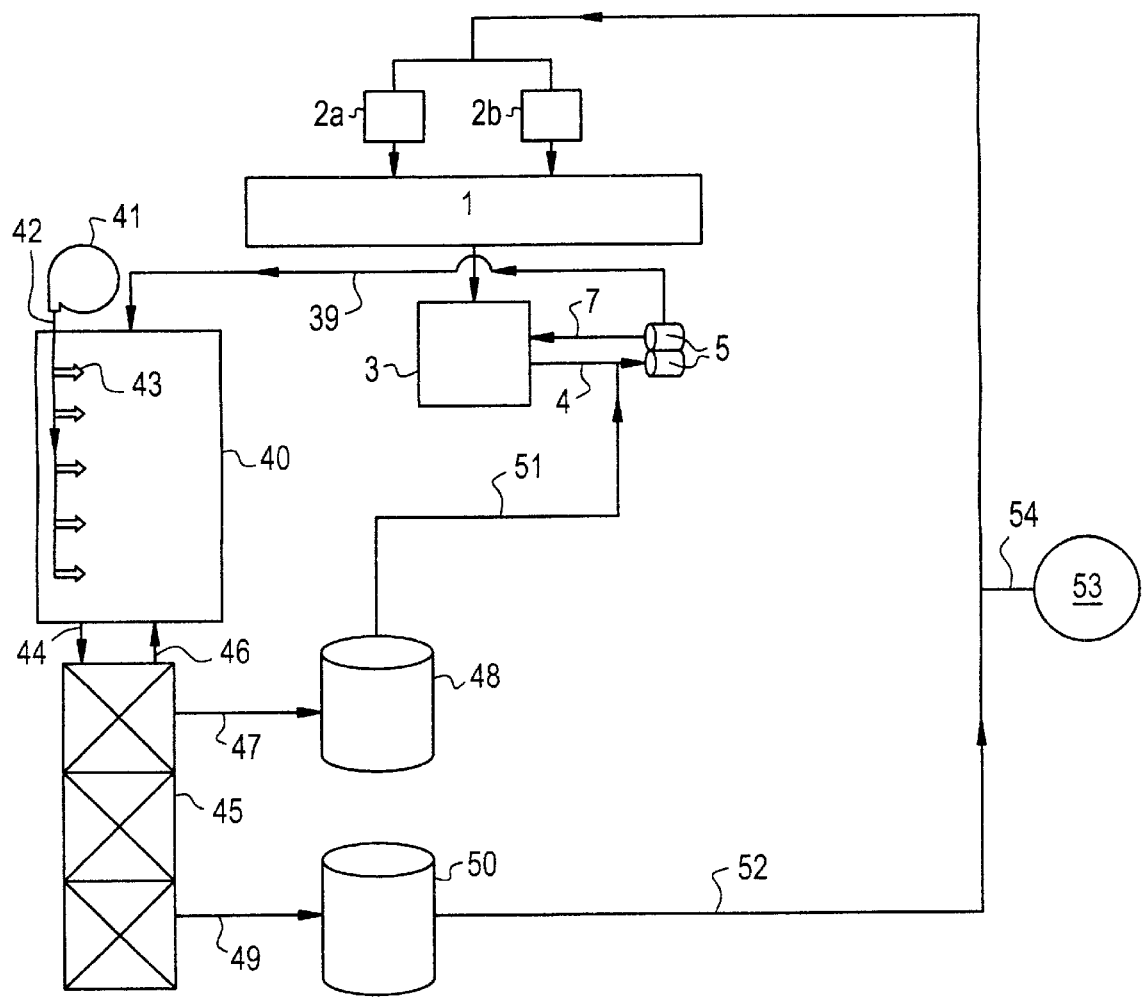
FIG. 3 is a flow diagram of a second prior art aerobic water treatment system.

FIG. 3 is a variation on the theme from FIG. 2, again showing equalization tank (3) connected by gravity feed line (4) to separator (5). Again, some of the water, or effluent, from the separator (5) is returned to the equaliztion tank (3) by return flow line (7) in order to maintain equilibrium flow from the equalization tank (3) to the separator (5). Effluent which is not returned to the equalization tank (3) is pumped through line (39) to a liquid aeration basin (40). In this case, the liquid aeration basin (40) is equipped with an air blowing system (41) connected by an air trunk line (42) having a set of several diffusion drops (43) into the basin (40). Air is flowed through the diffusion drops (43) and maintains circulation and activation of the effluent. Effluent from the aeration basin (40) is fed by effluent line (44) to a set of hopper clarifiers (45) which are equipped with a return activated sludge line (46) which feeds to the aeration basin (40), a waste sludge line (47) which feeds to a sludge holding tank (48), and supernatant line (49) which leads to a supernatant holding tank (50). The sludge holding tank (48) has an outlet line (51) to the separator (5). The supernatant holding tank (50) has an outlet line (52) which may lead to the flush tanks (2a,b), or to another utilization (53) such as a pond or field.

SUMMARY OF THE INVENTION

It is an object of the present invention to provide method of treating animal waste that does not rely on an open-air lagoon. A further object of this invention is to provide a method of treating animal waste that consistently yields potable water as an end result. It is yet a further object of this invention to provide a method of recycling water used in animal husbandry. Yet another object of this invention is to provide a method of reducing ammonia emissions as well as reducing phosphorus and nutrient content from agricultural sites to manageable levels. An even further object of this invention is to provide equipment for treating animal waste that need not be permanently installed.

The present inventors have found that a waste treatment system for an animal husbandry site can be constructed so that a waste stream can be carried to an equalization tank sized for the particular site. From the equalization tank the waste is pumped to a separator. The liquid stream from the separator flows to a first filter, then a nitrogen remover, followed by a second filter. The stream from the second filter is suitable for use as recycled water for some applications such as irrigation. Where pathogen removal is desired, the stream from the second filter is pumped to a pathogen remover. Optionally, the water stream can be split to produce a component which is flush water and subjected to one form of pathogen removal such a chlorination, and a second component which is subjected to a further filtering step and treated for biological contaminants to yield potable water, that is, drinking water. This water may be recycled to the animal husbandry site or discharged into a permitted stream.

An advantage of the present invention is that it consistently yields water of improved quality with a minimum of skilled human monitoring. A further advantage is that the recycled water can improve the quality of life of the animals, as reflected in improved weight gains and shorter residence times in feeding facilities. Yet another advantage is that the entire waste treatment system requires a negligible amount of land to operate, and can be treated as an appliance instead of a fixture.

These and other objects and advantages of the present invention will become apparent through the text and examples herein.

DETAILED DESCRIPTION OF THE INVENTION

Waste is washed from under the barns either from a flush tank system or pit recharge system. The waste stream enters a tank referred to herein as an equalization tank through pipes from each barn by gravity flow. The equalization tank is typically installed in the ground, and its size is determined by the volume of the barns' waste stream, which includes all waste material, including feces, urine, spillage, and washdown water. The equalization tank can be made of any number of materials known to those of ordinary skill in the art, including plastic, concrete, and metal.

A pump is used to bring the waste stream from the equalization tank to the first stage of the present invention, a separator. The pump can be any type known to those of ordinary skill in the art, including a grinder, centrifugal, trash, diaphragm, peristaltic and air displacement pumps. The waste stream is pumped through a pipe sized according to the desired flow rate to a separator capable of removing large solids, that is, solids bigger than about 100 to 300 microns, from the waste stream. Suitable separators include filter presses, auger-type separators and other separators useful for large particles. Inclined screen and roller press separators such as those available from Key Dollar Co. Milton-Freewater, Ore., are preferred. It is envisioned that more than one separator, such as an inclined screen separator and a roller press separator may be combined into a single piece of equipment.

The separator removes large solids from the waste stream and yields moist solids and an effluent which is "dirty" water with particles ranging up to about 300 microns. The moist solids can be captured and treated to produce other products such as fertilizer or animal feed. The effluent is filtered to remove solids to approximately the 25–100 micron range, preferably to at least about the 50–80 micron range. A wide variety of filters are known to those of ordinary skill in the art. Media filters and automatic backwash filters are preferred, both for availability and convenience of operation. The rate of filtration will be determined by the amount of water necessary to return to the barns for washing and drinking. The excess water from the separator is recycled to the equalization tank.

Where either an automated or a manual backwash filter is used, the fines from the backwash are sent to a separate sludge tank, where they are thickened with a flocculant, and then returned to a suitable storage tank such as the equalization tank, or a suitable filtering mechanism, such as the separator, and removed from the waste stream. Various flocculant formulations are known to those of ordinary skill in the art. A flocculant formulation made from MESP powder and FR powder blended with Tech Grade <#577 aluminum chloride solution, all available from GEO specialty Chemicals, Baltimore, Md., is preferred. Sluge treatment preferably takes place in two tanks operated in tandem. That is, a first tank is filled and treated with an additive while the second tank allows the additive sufficient time to work.

After leaving the first filter, the effluent is preferably treated to remove nitrogen and nitrogen derivatives. In theory, the nitrogen removal treatment could occur at any time after the first crude separation, but a small amount of carbon in the effluent enhances the effectiveness of one portion of the nitrogen removal process, so the nitrogen removal step is preferably placed after the first filter, where the water has a moderate load of carbon in the form of particles less than 100 microns in size. As is the case for sludge treatment, it is preferred to have two tanks operated in tandem to allow sufficient treatment time. The effluent at this point has a measurable oxygen demand. As one tank fills, the fluid level reaches a predetermined point, and an aerator begins a slow bubbling of air through the mixture. When aeration begins, the oxygen reacts preferentially with the carbon compounds in the mixture. Once the carbon is substantially oxidized, then the oxygen will begin to react with the dissolved ammonia to produce nitrates and nitrites. The dissolved oxygen content is monitored. The monitoring can be done automatically using any commercially available dissolved oxygen meter that is accurate to abouot ½ parts per million oxygen. When the dissolved level reaches a predetermined point near zero, aeration is halted, and the tank is allowed to rest, so that the ubiquitous bacteria in the tank strip oxygen from the nitrates and nitrites to produce nitrogen gas, which is allowed to escape into the atmosphere.

After nitrogen removal, the effluent stream is preferably pumped to a second filter, which removes particles in the 5–10 micron range. This filter further clarifies the effluent and also enhances the effect of subsequet pathogen removal steps. Pathogen removal can be accomplished using a variety of processes known to those of ordinary skill in the art, including chlorination, oxygenation, reverse osmosis and UV radiation. While it is conceivable that all the water could be treated in the same manner for pathogen removal using any of the known methods for doing so, the inventor has found it economically useful to use different methods according to the volume of water to be treated, and degree of effectiveness of the given treatment means. Thus, the stream continues by way of a pipe to a tee in the line where the separated and filtered water stream is split for treatment to remove pathogens according to its subsequent use. Most of the water will be diverted to a chlorinator. Any type of chlorinator known to those of ordinary skill in the art can be used. A chlorinator using chlorine tablets is preferred for ease and safety in use. Such equipment is available from Norweiko Inc., Norwalk, Ohio. The water is then held in a contact tank for at least the prescribed amount of time (typically at least 30 minutes), a process which removes most pathogens, and then is pumped back to the flush tank or pit recharge system for use as wash water. Water in excess of that needed to operate the flush tanks may be treated to yield potable water or irrigation water, or water for any other purpose. Where potable water is desired, the separated and filtered water is subjected to a second filtration step to remove particles to at least the 1–10 micron level and subjected to a more effective pathogen removal process. For example, the water can be treated with ozone using an ozonator such as those available from Aqua-Flow Water Conditioning Systems, Baltimore, Md., although in concept any form of pathogen removal can be used. One of ordinary skill in the art will readily recognize that although this description is written in terms of a preferred embodiment of the system, that the various filtration and pathogen removal steps can occur in any order.

The invention is contemplated to be used by farms both large and small. Water usage for finishing hogs, for example, would be about 3 gallons per head per day. For 2,000 hogs, the total would be 6,000 gallons of water per day. Water usage for sows on the other hand, may run up to about 18 gallons per sow per day. A farm with 5200 sows would be expected to use 48,000 to 30,000 gallons of water per day. Water usage on larger farms may be 95,000 gallons of wate per day or more.

For ease of use, it is preferred that all the components of the system be joined by use of unions before and after each component, to facilitate assembly and repair of the system.

The ultimate goal in some cases is to produce water of an acceptable quality for agricultural re-use, and in some cases to produce potable water, that is, drinking water. Where, for example, the potential end use of the effluent stream is irrigation, pathogen removal may not be required. In that event, water from the second filter may be used directly. Where the water must meet a "pathogen free" standard, treatment by chlorination may be sufficient. Where "potable" water is desired, the water is filtered so that the particle size is about 1 micron or less, and biological contaminants removed by a more effective pathogen treatment such as ozonation. The standards for potable water vary from jurisdiction to jurisdiction and from time to time. In addition, where a given set of pollutants is expected, new or different testing requirements may be imposed. General recommended limits for drinking water in North Carolina include: total Nitrogen 10 ppm, nitrate 10 ppm, nitrite 1 ppm.

EXAMPLE 1

To obtain a general idea of the scope of the problem, water samples from a lagoon at a privately operated hog farm were taken at the inlet (from the flush tanks) and the outlet (within the top two feet of water) and analyzed at a commercial laboratory, Industrial Maintenance Corporation, Wrightsville Beach, N.C., for biological oxygen demand, using the standard 5-day test. The results were reported as inlet, 654 parts per million biological oxygen demand ("ppm BOD" or "mg/L BOD") and outlet 550 ppm BOD.

EXAMPLE 2

A farm having four hog houses and a lagoon was segregated so that two of the houses continued to utilize the lagoon, while two houses were set up with a system corresponding to FIG. 2. This system was a closed loop system that is a precursor to the present invention. Each hog house was the same size, and had the same number of hogs. The hog houses used pit recharge systems, all of which were identical, and were equipped with an equalization tank. Samples were taken from the equalization tank and at the outlet for the new system as well as the lagoon. The samples were forwarded to a commercial laboratory, Environmental Chemists, Inc., Wrightsville Beach, N.C. and analyzed for biological oxygen demand using a 5-day test ("$BOD_5$ as $O_2$ mg/L"), Total Suspended Solids ("TSS") Phosphorus, Kjeldahl nitrogen, nitrates and nitrites, and ammonia nitrogen. The results are reported below.

| Test | Eq. Tanks | System Outlet | Lagoon Outlet |
| --- | --- | --- | --- |
| $BOD_5$ as $O_2$ mg/L | 3,488 | 43 | 429 |
| TSS mg/L | 10,650 | 80 | 620 |
| Total Phosphorus, mg/L | 550 | 13.6 | 84.2 |
| Kjeldahl Nitrogen mg/L | 2,050 | 85.1 | 658 |
| Nitrate + Nitrite – Nitrogen mg/L | 1.49 | 0.20 | <1 |
| Ammonia Nitrogen mg/L | 1,460 | 72.4 | 559 |

These results show that quality of the water produced by the system represents a substantial improvement over the lagoon-treated water. Biological oxygen demand, suspended solids, phosphorus, total nitrogen and ammonia nitrogen are all substantially reduced. The results show that ammonia nitrogen has been in part converted by the system to nitrate and nitrite, but these numbers are still well below those of the water from the hog barns and lagoon.

On another occasion, the Department of Environmental Management sampled the system outlet and the lagoon outlet to make further comparisons between the two. Results are reported below:

| Test | Lagoon | System | Improvement, % |
| --- | --- | --- | --- |
| $BOD_5$ as $O_2$ mg/L | 1760 | 36 | 97.9 |
| Fecal Coliform/100 ml | 3,600,000 | >212,000 | 22299.67 |
| Cadmium μg/L | 3.8 | 2.6 | 31.6 |
| Chromium μg/L | 19.0 | 19.1 | same |
| copper μg/L | 83 | 39 | 53.1 |
| nickel μg/L | 98 | 77 | 21.5 |
| lead μg/L | 124 | 96 | 22.5 |
| zinc μg/L | 918 | 454 | 50.5 |
| Total suspended solids mg/L | 510 | 85 | 83.4 |

These results again confirm the reduction in biological oxygen demand and total suspended solids, along with both a reduction dissolved metals.

EXAMPLE 3

Hogs were placed in the 4 houses of the farm of Example 2 for the final stage of weight gain before market, and the hogs in the houses with the semi-portable system had completed the desired weight gain 7–10 days ahead of the hogs in the lagoon-fed houses. The experiment was tried again using another batch of pigs, with the same result. In subsequent groups, the inventor has found a persistent week to 10-day advantage in using the invented sytems, which yield consistently improved water quality. The water quality that resulted was not sufficient to be referred to a "potable" water.

EXAMPLE 4

A system as described in FIG. 3 was sampled, and the samples were forwarded to a commercial laboratory, Southern Testing & Research Laboratories, Inc. 3809 Airport Drive, Wilson, N.C., with water quality results reported as follows:

| Test | Inlet | Outlet |
| --- | --- | --- |
| Biochemical Oxygen Demand EPA 405.1 mg/L | 3300 | 39 |
| $BOD_5$ as $O_2$ mg/L | 3,140 | 16 |
| TSS mg/L | 2,110 | 88 |
| Total Phosphorus mg/L | 104 | 65.4 |
| Total Nitrogen mg/L | 382 | 22.7 |
| Kjeldahl Nitrogen mg/L | 382 | 20.2 |
| Ammonia Nitrogen mg/L | 243 | 8.44 |
| Nitrate mg/L | nd | 2.32 |
| Nitrite mg/L | 0.012 | 0.219 |

The Biochemical Oxygen Demand test, No. EPA 405.1 yielded somewhat different results from the 5-day biological oxygen demand test, but in each case, the numbers were substantially improved after treatment. The same is true with respect to Total solids, phosphorus, and nitrogen, as well as ammonia nitrogen. As expected, some of the ammonia was converted to nitrate and nitrite, although these numbers are still within acceptable levels (10 mg/L or less).

While particular embodiments of the invention have been described in detail, it will be apparent to those skilled in the art that these embodiments are exemplary rather than limiting, and the true scope of the invention is that defined by the following claims.

We claim:

1. A device for treating waste water from an animal husbandry site having a means for holding waste water and a means for holding recycled water, comprising a separator, having a first inlet from the means for holding waste water from animal husbandry site, and a first outlet to a first filter, for removing solids having a size greater than about 100 to 300 microns in diameter, thereby yielding moist solid product and an effluent stream, the first filter having an inlet from the separator, a first outlet to a means for treating water to remove nitrogen and nitrogen derivatives, and a second outlet to a sludge treatment system, for filtering solids having a diameter of about 25–100 microns from water, thereby yielding a filtered effluent stream and a first sludge stream, the means for treating water to remove nitrogen and nitrogen derivatives having an inlet from the first filter, a first outlet to a second filter, and a second outlet to the sludge treatment system, yielding a filtered, treated water stream having reduced levels of nitrogen and nitrogen derivatives and a second sludge stream, the second filter having an inlet from the means for treating water to remove nitrogen and nitrogen derivatives, a first outlet, and a sludge outlet to the sludge treatment system, for separating particles of about 10 to 50 microns from a water stream, yielding an effluent which is filtered, treated water stream and a third sludge stream, a first means for treating water to remove pathogens having an inlet from the first outlet of the second filter, and an outlet to the means for holding recycled water at the animal husbandry site, wherein the second filter has an second outlet to a third filter, the third filter having an inlet from the second filter, and an outlet to a second pathogen treatment system, whereby a portion of the effluent stream from the second filter is returned to the means for holding recycled water at the animal husbandry site, and a portion flows to the third filter and second means for treating water to remove pathogens, for removing particles in the range of about 1 to 10 microns, the second means for treating water to remove pathogens having an inlet from the third filter and an outlet, for removing biological contaminants from a water stream, the combination of the second filter and the second means for treating water to remove pathogens yielding a potable water stream, the sludge treatment system comprising one or more sludge tanks having an inlet from the first filter, second filter, and the means for removing nitrogen and nitrogen derivatives, an additive reservoir and means for injecting an additive from the reservoir to the sludge tanks, and an outlet to the means for holding waste water.

2. The device of claim 1 wherein the first means for treating water to remove pathogens is a chlorinator.

3. The device of claim 1 wherein the first means for treating water to remove pathogens is a chlorinator, and the second means for treating water to remove pathogens is an ozonator.

4. The device of claim 3 wherein the second filter has a third outlet to the animal husbandry site.

5. The device of claim 3 wherein the first means for treating water to remove pathogens has a second outlet to the animal husbandry site.

* * * * *